United States Patent
Hirai et al.

(10) Patent No.: US 7,665,900 B2
(45) Date of Patent: Feb. 23, 2010

(54) VEHICLE WHEEL BEARING APPARATUS

(75) Inventors: Isao Hirai, Iwata (JP); Takayuki Norimatsu, Iwata (JP); Hiroya Kato, Iwata (JP); Akira Fujimura, Iwata (JP); Kikuo Fukada, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/194,892

(22) Filed: Aug. 20, 2008

(65) Prior Publication Data

US 2009/0046969 A1 Feb. 19, 2009

Related U.S. Application Data

(63) Continuation of application No. PCT/JP2007/050611, filed on Jan. 17, 2007.

(30) Foreign Application Priority Data

Feb. 21, 2006 (JP) .............................. 2006-044231

(51) Int. Cl.
*F16C 13/00* (2006.01)

(52) U.S. Cl. ..................................... 384/589

(58) Field of Classification Search ......... 384/537–538, 384/543–544, 589, 625

See application file for complete search history.

(56) References Cited

U.S. PATENT DOCUMENTS

| 6,286,909 | B1 * | 9/2001 | Mizukoshi et al. | 301/105.1 |
| 6,715,926 | B2 * | 4/2004 | Tajima et al. | 384/544 |
| 7,118,182 | B2 * | 10/2006 | Kayama et al. | 301/105.1 |
| 2003/0012474 | A1 * | 1/2003 | Tajima et al. | 384/544 |
| 2003/0039423 | A1 * | 2/2003 | Sahashi et al. | 384/544 |
| 2004/0022468 | A1 * | 2/2004 | Nomura et al. | 384/544 |
| 2004/0022471 | A1 * | 2/2004 | Yamamoto | 384/544 |
| 2004/0120622 | A1 * | 6/2004 | Tajima et al. | 384/544 |
| 2005/0141798 | A1 * | 6/2005 | Okasaka | 384/544 |
| 2006/0023984 | A1 * | 2/2006 | Terada et al. | 384/544 |

FOREIGN PATENT DOCUMENTS

| EP | 1396354 A1 * | 3/2004 |
| JP | 10-044702 | 2/1998 |
| JP | 11-005404 | 1/1999 |
| JP | 2000-087979 | 3/2000 |
| JP | 2002-283806 | 10/2002 |
| JP | 2005127450 A * | 5/2005 |

* cited by examiner

*Primary Examiner*—Marcus Charles
(74) *Attorney, Agent, or Firm*—Harness, Dickey & Pierce, P.L.C.

(57) ABSTRACT

A vehicle wheel bearing apparatus has an outer member with double row outer raceway surfaces on its inner circumferential surface. An inner member includes a wheel hub and at least one inner ring. An outer joint member forms a constant velocity universal joint. The outer joint member has a cup-shaped mouth portion. A shoulder portion forms the bottom of the mouth portion. A shaft portion axially extends from the shoulder portion. The shaft is axially separably and torque transmittably inserted into the wheel hub with the shoulder abutted against the caulked portion to transmit torque. The inner ring is axially secured relative to the wheel hub by a caulked portion. The caulked portion is formed by plastically deforming, radially outwardly, the end portion of the cylindrical portion. The caulked portion has a flat surface formed by a cutting process that is adapted to surface contact the shoulder. The radially outermost end of the flat surface is arranged so that it does not abut against the shoulder.

5 Claims, 4 Drawing Sheets

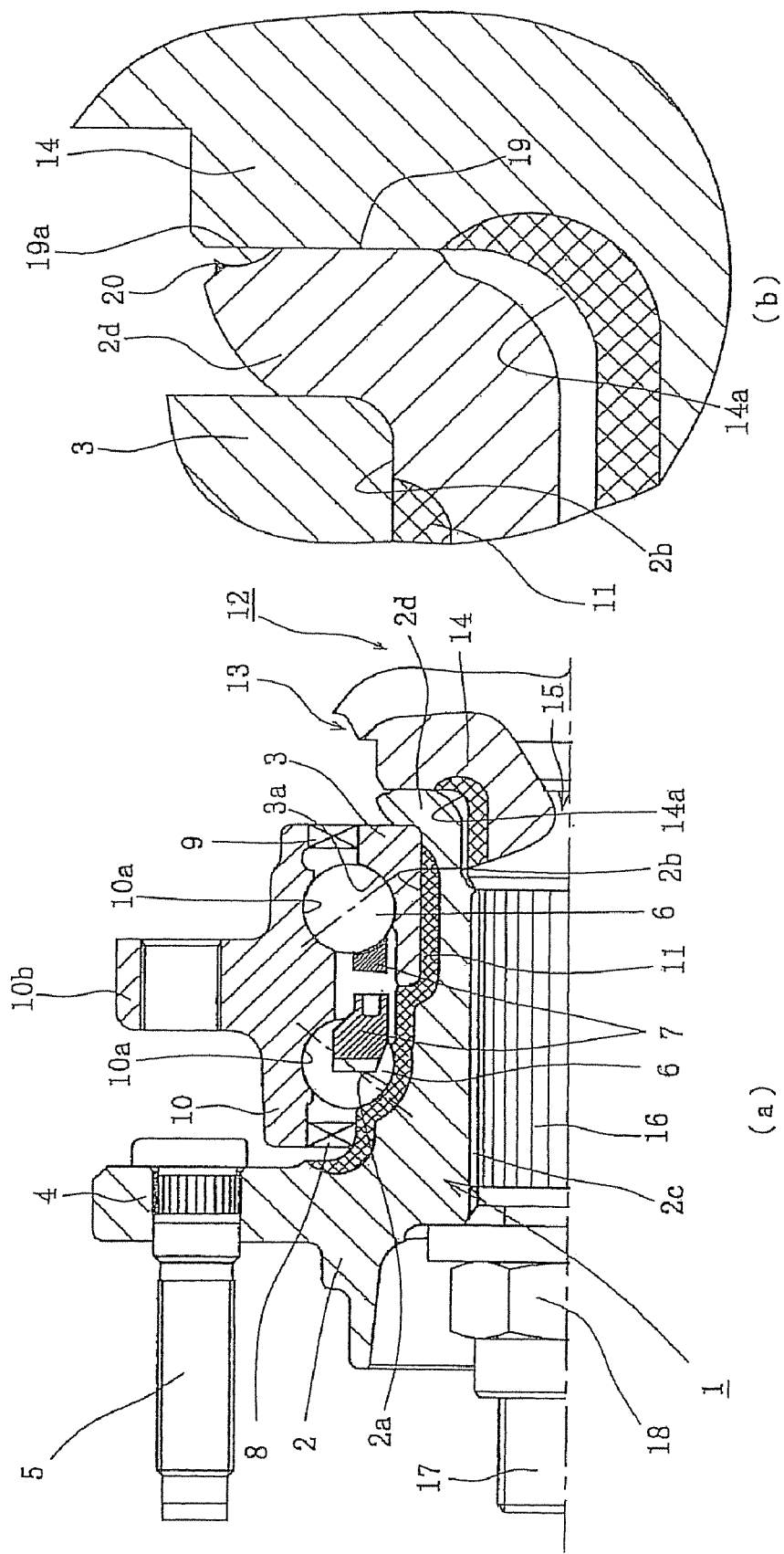

[Fig 1]
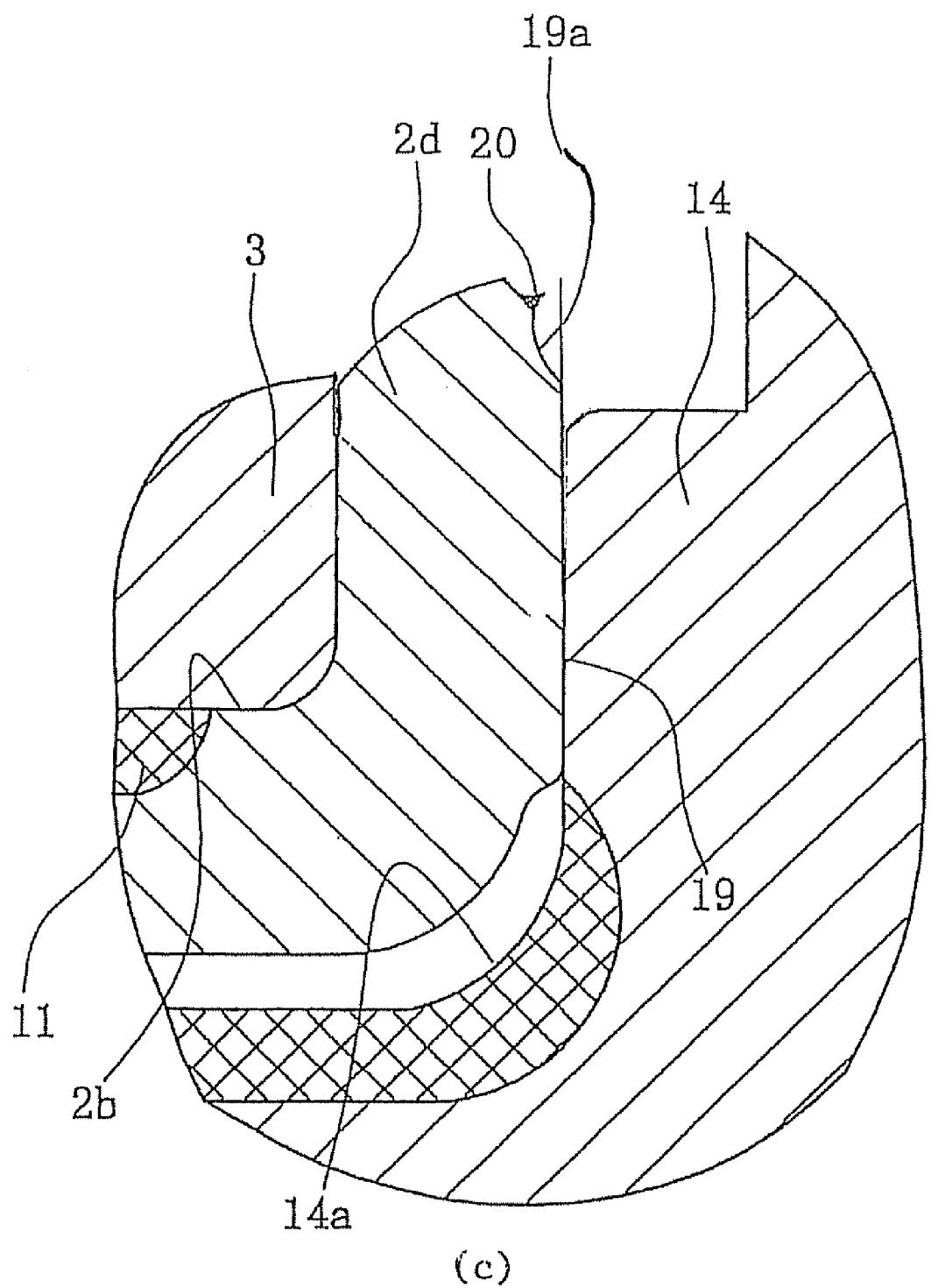
(c)

[ Fig 2 ]
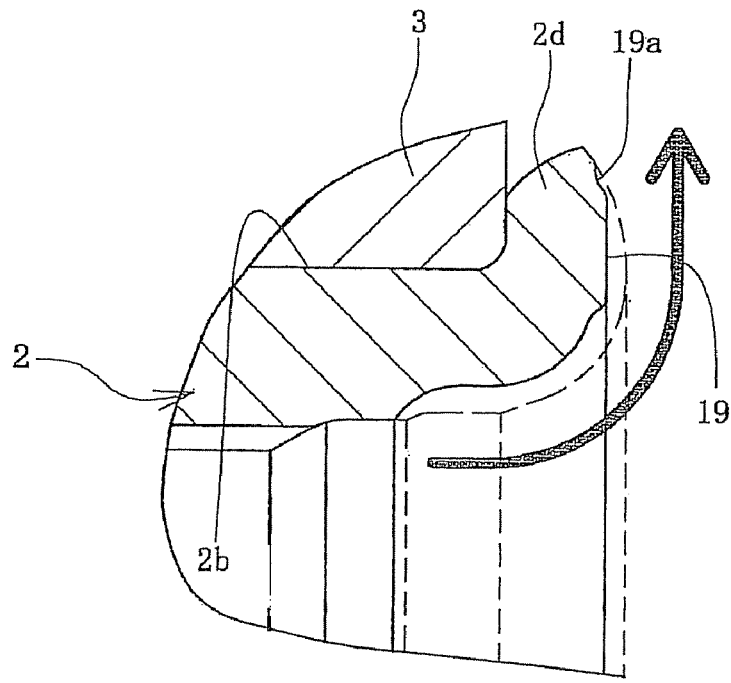
[ Fig 3 ]
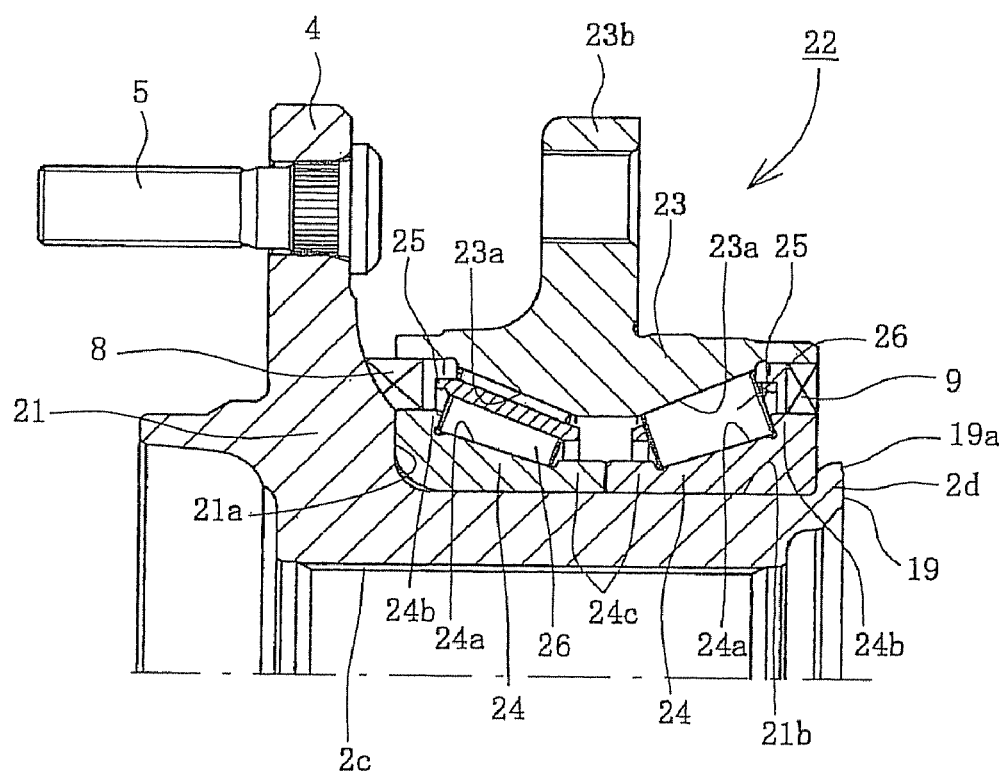

[Fig 4]
PRIOR ART
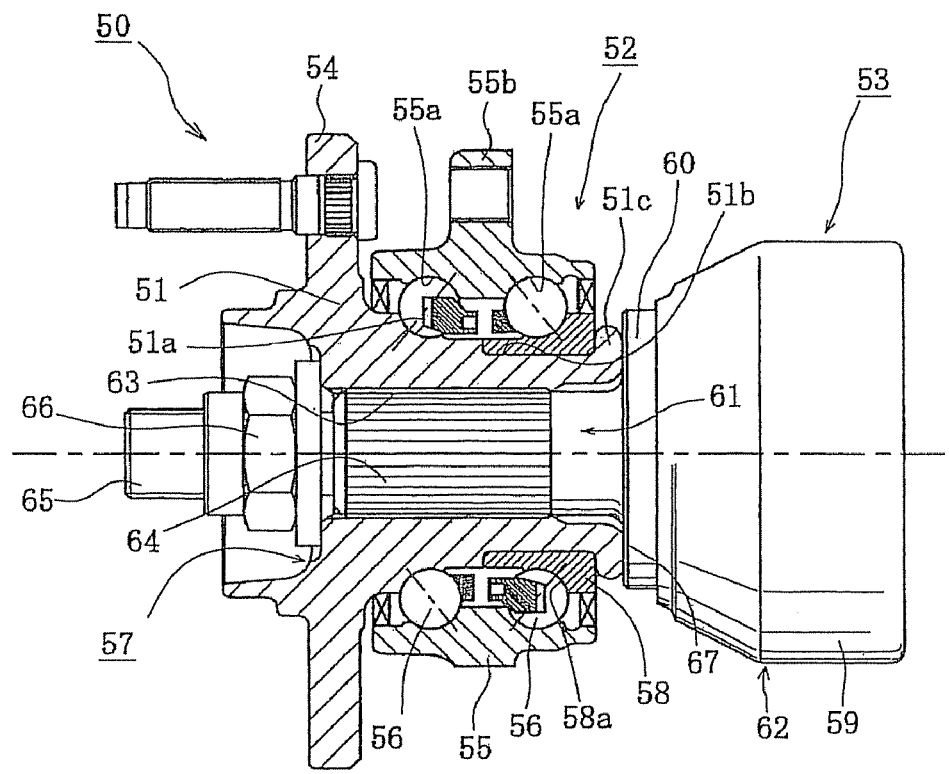
[Fig 5]
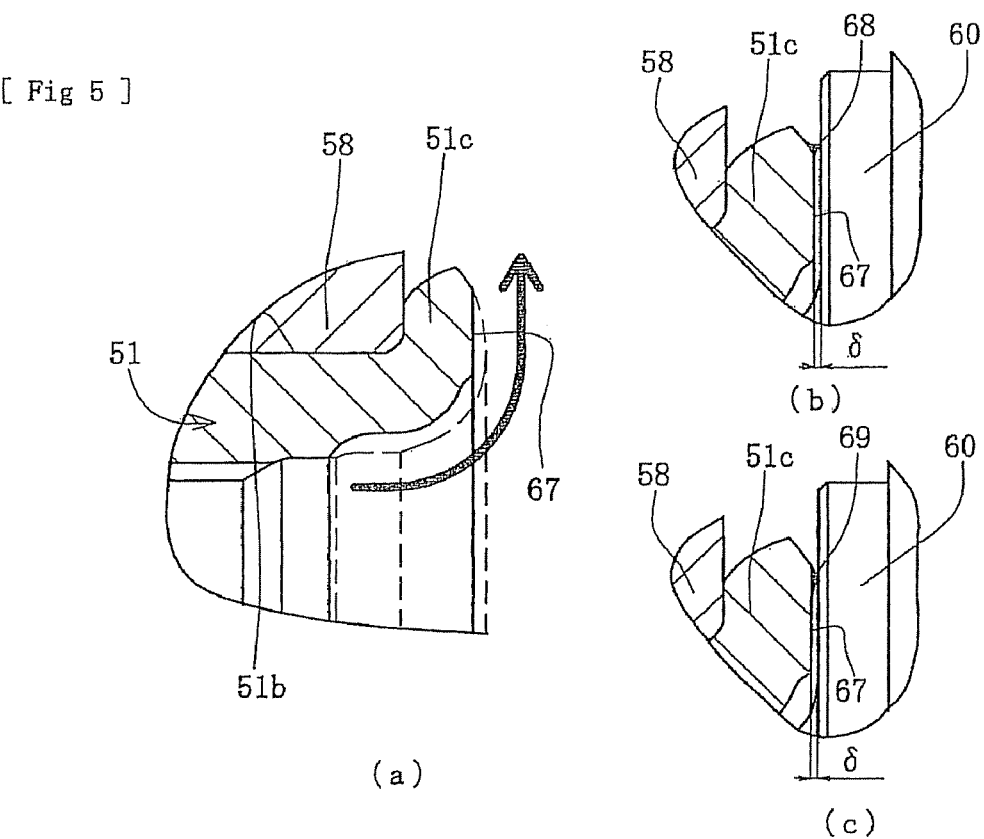
(a)
(b)
(c)

VEHICLE WHEEL BEARING APPARATUS

CROSS-REFERENCE TO RELATED APPLICATIONS

This application is a continuation of International Application No. PCT/JP2007/050611, filed Jan. 17, 2007, which claims priority to Japanese Application No. 2006-044231, filed Feb. 21, 2006. The disclosures of the above applications are incorporated herein by reference.

FIELD

The present disclosure relates to a bearing apparatus that supports a wheel of a vehicle, such as an automobile and, more particularly, to a vehicle wheel bearing apparatus with a wheel bearing and a constant velocity universal joint to rotatably support a driving wheel (a front wheel of FF vehicle, a rear wheel of FR or RR vehicle, and front and rear wheels of 4 WD vehicle) relative to a suspension apparatus.

BACKGROUND

A vehicle power transmitting apparatus is required not only to transmit power from an engine to a wheel but to enable radial and axial displacements or moment displacement of the wheel caused by bounce of the vehicle during rolling on a rough road or during turning of the vehicle. Accordingly, one end of a driving shaft, arranged between the engine and the driving wheel, is connected to a differential gear unit, via a sliding type constant velocity universal joint. The other end is connected to the driving wheel, via a bearing apparatus. The driving wheel includes a non-sliding type constant velocity universal joint.

Several types of structures of the wheel bearing apparatus have been proposed. One type is shown in FIG. 4. Here, the driving wheel bearing apparatus 50 has a wheel hub 51 adapted to mount a wheel (not shown) at one end. A double row rolling bearing 52 rotatably supports the wheel hub 51. A secured type constant velocity universal joint 53 transmits the power of the driving shaft (not shown) to the wheel hub 51.

The wheel hub 51 has an integrally formed wheel mounting flange 54. Its outer circumferential surface is formed with an inner raceway surface 51a. A cylindrical portion 51b axially extends from the inner raceway surface 51a. The double row rolling bearing 52 has an outer member 55 integrally formed with a body mounting flange 55b on its outer circumferential surface. A double row outer raceway surfaces 55a, 55a is formed on its inner circumferential surface. An inner member 57 is inserted into the outer member 55 via double row rolling elements (balls) 56, 56, contained within the outer member 55.

The inner member 57 include the wheel hub 51. An inner ring 58 is press-fit onto the axially extending portion 51b of the wheel hub 51. The inner ring 58 is formed with an inner raceway surface 58a on its outer circumferential surface. The inner ring 58 is axially immovable secured relative to the wheel hub 51 by a caulked portion 51c. The caulked portion 51c is formed by plastically deforming, radially outwardly, the end portion of the axially extending portion 51b of the wheel hub 51.

The constant velocity universal joint 53 includes a mouth portion 59. An outer joint member 62 is integrally formed with a shoulder 60 that forms the bottom of the mouth portion 59. A shaft portion 61 extends from the shoulder 60. The outer joint member 62 is inserted into the inner member 57 (wheel hub 51) in a manner to enable torque transmission between the two. That is, serrations 63 formed on the inner circumferential surface of the wheel hub 51 mate with serrations 64 formed on the outer circumferential surface of the shaft portion 61 of the outer joint member 62. The shaft portion 61 of the outer joint member 62 is inserted into the wheel hub 51 until the shoulder 60 of the outer joint member 62 abuts against the caulked portion 51c. The wheel hub 51 and the outer joint member 62 are joined together so as not to be axially separated by fastening a securing nut 66, at a predetermined fastening torque, on an external thread 65 formed on the end of the shaft portion 61.

It is known that a large torque is applied from the engine to the driving wheel via a sliding type constant velocity universal joint (not shown) at a time of increasing engine speed (at the time of starting the vehicle and thus torsion is caused on the drive shaft). Accordingly, torsion is also caused on the inner member 57 of the double row rolling bearing 52 that supports the driving shaft. When the large torque is caused on the drive shaft, stick-slip noise is caused by sudden slip between the mutually abutting surfaces of the outer joint member 62 and the inner member 57. The slips are caused by a circumferential gap between the serrations 63 of the wheel hub 51 and the serrations 64 of the shaft portion 61 of the outer joint member 62.

In order to deal with this problem, the prior art vehicle wheel bearing apparatus 50 has the end surface of the caulked portion 51c of the wheel hub 51, against which the shoulder 60 of the outer joint member 62 abuts, finished as a flat surface 67. This makes it possible to bring surface contact between the caulked portion 51c and the shoulder 60. Thus, this reduces the surface stress applied to the caulked portion 51c by the fastening force of the nut 66. Accordingly, it is possible to prevent plastic deformation of the caulked portion 51c as well as loosening of the nut 66. Thus, this prevents the generation of the stick-slip noise due to sudden slip between the abutting surfaces of the shoulder 60 and the caulked portion 51c (see Japanese Patent No. 3533883).

SUMMARY

In prior art vehicle wheel bearing apparatus, since the caulked portion 51c of the wheel hub 51 is finished as a flat surface 67, it is possible to bring surface contact between the caulked portion 51 and the shoulder 60 and thus to reduce the surface pressure applied to the caulked portion 51c. This prevents the generation of the stick-slip noise due to sudden slip between the abutting surfaces of the shoulder 60 and the caulked portion 51c. In such a case, the end portion of the cylindrical portion 51b is plastically deformed, radially outwardly (shown by dotted line in FIG. 5(a)), and then the caulked end surface is cut along an arrow to form the flat surface 67. During cutting, burrs 68 or warps 69 are sometimes caused by the cutting process on the corner portion of the caulked portion as shown in Figs. (b) and (c). Although these burrs 68 and warps 69 are compressed and crushed between the flat surface 67 and the shoulder portion 60 by the fastening of the securing nut 66, a micro axial gap δ is caused between them. This axial gap δ causes a line contact between the flat surface 67 of the caulked portion 51c and the shoulder portion 60. Thus, this increases the surface pressure applied to the caulked portion 51c and accordingly causes the stick-slip noise due to sudden slip between the caulked portion 51c and the shoulder portion 60.

Therefore, it is an object of the present disclosure to provide a vehicle wheel bearing apparatus where the caulked portion is formed with a flat surface to reduce the surface pressure applied to the caulked portion. Also, its an object to prevent plastic deformation of the caulked portion and loosening of the securing nut. Further, it is an object to prevent the generation of the stick-slip noise.

Accordingly, a vehicle wheel bearing apparatus comprises an outer member formed with double row outer raceway surfaces on its inner circumferential surface. An inner member includes a wheel hub and at least one inner ring. The wheel hub has a wheel mounting flange formed at one of its end portions. A cylindrical portion axially extends from the wheel mounting flange. The inner ring has a plurality of inner raceway surfaces adapted to be arranged opposite to the plurality of outer raceway surfaces. The inner ring is press fit onto the cylindrical portion of the wheel hub. Double row rolling elements are freely rollably contained between the outer and inner raceway surfaces. An outer joint member forms a constant velocity universal joint. The outer joint member has a cup-shaped mouth portion. A shoulder portion forms the bottom of the mouth portion. A shaft portion axially extends from the shoulder portion. The shaft portion, axially separably and torque transmittably, inserts into the wheel hub with the shoulder portion abutted against the caulked portion to transmit torque between the two. The inner ring is axially secured relative to the wheel hub by a caulked portion. The caulked portion is formed by plastically deforming, radially outwardly, the end portion of the cylindrical portion. The caulked portion has a flat surface formed by a cutting process. The flat surface is adapted to be in surface contact with the shoulder. The radially outermost end of the flat surface is arranged so that it does not abut against the shoulder.

The caulked portion has a flat surface formed by a cutting process and is adapted to be in surface contact with the shoulder. The radially outermost end of the flat surface is arranged so that it does not abut against the shoulder. Thus, it is possible to assure surface contact between the shoulder portion and the caulked portion even if burrs and/or warps are generated on the radially outermost end of the caulked portion by the cutting process. Thus, this makes it possible to reduce the surface pressure applied to the caulked portion by the fastening force of the securing nut. Thus, this prevents plastic deformation of the caulked portion and loosening of the nut. Also, it prevents the generation of the sudden stick-slip noise between mutually abutting surfaces of the caulking portion and the shoulder portion.

The radially outermost end of the flat surface is formed with a slightly recessed annular portion. This prevents the burrs etc. generated on the radially outermost end from projecting from the flat surface of the caulked portion. Thus, this assures surface contact between the shoulder portion and the caulked portion.

The radially outermost end of the flat surface is formed with a larger diameter than a diameter of the radially outermost end of the shoulder of the outer joint member. Thus, surface contact between the shoulder portion and the caulked portion is not adversely affected by the burrs generated by cutting process on the radially outermost end of the caulked portion.

The caulked portion remains as a non-quenched portion with a surface hardness below 25 HRC after forging. A hardened layer of the outer joint member is limited to a region of a corner portion of the shoulder portion. The shoulder portion abutting against the caulked portion remains as a non-quenched portion with a surface hardness below 25 HRC after forging. This suppresses wear of the caulked portion caused by the difference in hardness and prevents loosening of the fastening nut.

The vehicle wheel bearing apparatus of the present disclosure comprises an outer member formed with double row outer raceway surfaces on its inner circumferential surface. An inner member includes a wheel hub and at least one inner ring. The wheel hub has a wheel mounting flange formed at one end. A cylindrical portion axially extends from the wheel mounting flange. The inner ring has a plurality of inner raceway surfaces arranged opposite to the plurality of outer raceway surfaces. The inner ring is press fit onto the cylindrical portion of the wheel hub. Double row rolling elements are freely rollably contained between the outer and inner raceway surfaces. An outer joint member forms a constant velocity universal joint. The outer joint member has a cup-shaped mouth portion. A shoulder portion forms the bottom of the mouth portion. A shaft portion axially extends from the shoulder portion and is inserted into the wheel hub. The shaft portion is axially separable and transmits torque with the wheel hub while the shoulder portion is abutted against the caulked portion. The inner ring is axially secured relative to the wheel hub by a caulked portion. The caulked portion is formed by plastically deforming, radially outwardly, the end portion of the cylindrical portion. The caulked portion has a flat surface formed by a cutting process. The flat surface contacts the shoulder. The radially outermost end of the flat surface is arranged so that it does not abut against the shoulder. Thus, it is possible to assure surface contact between the shoulder portion and the caulked portion even if burrs and/or warps are generated by the cutting process on the radially outermost end of the caulked portion. Thus, this reduces the surface pressure applied to the caulked portion by the fastening force of the securing nut. It prevents plastic deformation of the caulked portion and loosening of the nut. Also, it prevents the generation of sudden stick-slip noise between mutually abutting surfaces of the caulking portion and the shoulder portion.

A vehicle wheel bearing apparatus comprises an outer member with a body mounting flange integrally formed on its outer circumferential surface. Double row outer raceway surfaces are formed on its inner circumferential surface. An inner member includes a wheel hub and an inner ring. The wheel hub has one inner raceway surface arranged opposite to one of the double row outer raceway surfaces and. A cylindrical portion axially extends from the one inner raceway surface. The inner ring has the other inner raceway surface arranged opposite to the other of double row outer raceway surfaces. The inner ring is press fit onto the cylindrical portion of the wheel hub. Double row rolling elements are freely rollably contained between the outer and inner raceway surfaces. An outer joint member forms a constant velocity universal joint. The outer joint member has a cup-shaped mouth portion. A shoulder portion forms the bottom of the mouth portion. A shaft portion axially extends from the shoulder portion. The shaft portion is inserted into the inner member to transmit torque between the two. The inner ring is axially secured relative to the wheel hub by a caulked portion. The caulked portion is formed by plastically deforming, radially outwardly, the end portion of the cylindrical portion. The outer joint member is inserted into the inner member. It is axially separably and torque transmittably retained with the shoulder portion abutted against the caulked portion. The caulked portion has a flat surface formed by a cutting process. The flat surface is adapted to be in surface contact with the shoulder. The radially outermost end of the flat surface is formed with a slightly recessed annular portion. The abutted portion between the shoulder portion and the caulked portion remains as a non-quenched portion with a surface hardness below 25 HRC after it is forged.

Further areas of applicability will become apparent from the description provided herein. The description and specific examples in this summary are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

FIG. 1(a) is a longitudinal section view of a first embodiment of a vehicle wheel bearing apparatus.

FIG. 1(b) is an enlarged partial view of FIG. 1(a).

FIG. 1(c) is an enlarged view like that of FIG. 1(b) illustrating the flat surface larger than the radial outermost end of the shoulder.

FIG. 2 is an explanatory view showing a method for forming a caulking portion of FIG. 1.

FIG. 3 is a longitudinal section view of a second embodiment of a vehicle wheel bearing apparatus.

FIG. 4 is a longitudinal section view of a prior art vehicle wheel bearing apparatus.

FIG. 5(a) is an explanatory view showing a method for forming a caulking portion of FIG. 4.

FIGS. 5(b) and (c) are partially enlarged view FIG. 4.

DETAILED DESCRIPTION

The preferred embodiments will be described with reference to the accompanying drawings.

FIG. 1(a) is a longitudinal section view of a first embodiment of the bearing apparatus. FIG. 1(b) is an enlarged partial view of FIG. 1(a). FIG. 2 is an explanatory view of a method for forming a caulking portion of FIG. 1. In the description below, the term "outer side" (left-hand side in drawings) of the apparatus denotes a side that is positioned outside of the vehicle body. The term "inner side" (right-hand side in drawings) of the apparatus denotes a side that is positioned inside of the body when the bearing apparatus is mounted on the vehicle body.

The illustrated vehicle wheel bearing apparatus is a so-called third generation type and includes an inner member 1, an outer member 10, and double row rolling elements (balls) 6 rollably contained between the inner and outer members 1, 10. The inner member 1 has a wheel hub 2 and a separate inner ring 3 press-fit onto the wheel hub 2.

The wheel hub 2 has an integrally formed wheel mounting flange 4 to mount a wheel (not shown) at the outer side end. An inner raceway surface 2a is formed on its outer circumferential surface. The wheel hub 2 has also a cylindrical portion 2b that axially extends from the inner raceway surface 2a. A serration (or spline), for torque transmission, is formed on its inner circumferential surface. Hub bolts 5, to secure a wheel on the flange 4, are equidistantly arranged along the periphery of the flange 4.

The inner ring 3 is formed with the other (i.e. inner side) inner raceway surface 3a on its outer circumferential surface. The inner ring 3 is press-fit onto the axially extending portion 2b of the wheel hub 2. The inner ring 3 is axially immovably secured to prevent it from falling off the wheel hub 2 by a caulked portion 2d. The caulked portion 2d is formed by plastically, deforming radially, outwardly the end portion of the axially extending portion 2b.

The wheel hub 2 is made of medium carbon steel including carbon of 0.40~0.80% by weight such as S53C. A hardened layer 11 (shown by cross-hatching in FIG. 1) is formed by high frequency hardening on the wheel hub 2 with a surface hardness of 58~64 HRC. The surface is hardened over a region that includes the inner raceway surface 2a, a seal land portion, on which a sealing means 8 can slide, and the axially extending portion 2b. The inner ring 3 is made of high carbon chrome bearing steel such as SUJ2. It is hardened to its core by dip quenching to have a surface hardness of 58~64 HRC. A high frequency induction hardening pattern increases the strength of the wheel hub 2 and suppress fretting wear at the fitting surface of the inner ring 3. Thus, this improves the durability of the bearing apparatus. The caulked portion 2d remains as a non-quenched portion with a surface hardness below 25 HRC after its forging.

The outer member 10 is integrally formed with a body mounting flange 10b on its outer circumferential surface. The body mounting flange 10b mounts the outer member 10 onto a body (not shown). The outer member's inner circumferential surface is formed with double row outer raceway surfaces 10a and 10a that oppose the inner raceway surfaces 2a and 3a. The outer member 10 is made of medium carbon steel including carbon of 0.40~0.80% by weight such as S53C. The double row outer raceway surfaces 10a, 10a are hardened by high frequency induction hardening to have a surface hardness of 58~64 HRC.

Double row rolling elements 6 and 6 are freely rollably contained between the outer and inner raceway surfaces 10a, 10a and 2a, 3a by cages 7 and 7. Seals 8 and 9 are arranged at the ends of the outer member 10 to prevent leakage of grease contained within the bearing as well as the ingress of rain water or dusts from the outside.

The outer joint member 13 is formed with a constant speed universal joint 12. It has a shoulder portion 14 that forms the bottom of a cup-shaped mouth portion (not shown). A shaft portion 15 axially extends from the shoulder portion 14. The outer joint member 13 is made of medium carbon steel including carbon of 0.40~0.80% by weight such as S53C. It is formed with a hardened layer with a surface hardness of 50~64 HRC. The hardened layer is formed by high frequency induction hardening and extends from the shoulder 14 to the shaft portion 15.

A serration (or spline) 16 and an external thread 17 are formed on the outer circumferential surface of the shaft portion 15 of the outer joint member 13. The serration 16 of the shaft portion 15 meshes with the serration 2c of the wheel hub 2 to transmit torque between the two. The shaft portion 15 of the outer joint member 13 is inserted into the wheel hub 2 until the shoulder 14 of the outer joint member 13 abuts the caulked portion 2d of the wheel hub 2. A securing nut 18 is fastened to the external thread 17 of the shaft portion 15 at a predetermined fastening torque to provide axial separability and torque transmitability.

The end portion of the cylindrical portion 2b of the wheel hub 2 is cut, from the radially inner side to the radially outer side, along an arrow (FIG. 2), to form a flat surface 19 on the caulked portion 2d after the end portion of the cylindrical portion 2b is plastically deformed (shown by a dotted line). The radially outermost end of the flat surface 19 is formed with a slightly recessed annular portion 19a. This annular portion 19a enables, as shown in FIG. 1(b), surface contact between the shoulder portion 14 of the outer joint member 13 and the caulked portion 2d even if burrs (and/or warps) 20 are generated during the cutting process on the radially outermost end of the caulked portion 2d. Thus, this makes it possible to reduce the surface pressure applied to the caulked portion 2d by the fastening force of the securing nut 18. This prevents plastic deformation of the caulked portion 2d and loosening of the nut 18. Also, it prevents the generation of sudden stick-slip noise between mutually abutting surfaces of the caulking portion 2d and the shoulder portion 14.

According to the described embodiment, it is shown that the surface contact between the shoulder portion 14 and the caulked portion 2d is assured by the provision of the slightly recessed annular portion 19a formed on the radially outermost end of the flat surface 19. However, the present disclosure is not limited to the illustrated embodiment and the same effects will be obtained by making the diameter of the radially outermost end of the flat surface 19 larger than that of the radially outermost end (corner portion of a chamfered portion) of the shoulder 14 of the outer joint member 13.

In addition, the caulked portion 2d remains as a non-quenched portion with a surface hardness below 25 HRC after forging. A region of a hardened layer of the outer joint member 13 is limited within a region of a corner portion 14a of the shoulder portion 14. Thus, the shoulder portion 14, abutting against the caulked portion 2d, remains as a non-quenched portion with a surface hardness below 25 HRC after forging. This suppresses wear of the caulked portion 2d caused by differences in hardness and thus prevents loosening of the fastening nut 18.

FIG. 3 is a longitudinal section view of a second embodiment of a vehicle wheel bearing apparatus. In this embodiment, the same reference numerals are used to designate the same parts, portions and functions as those of the first embodiment and thus a detailed description of them will be omitted.

This vehicle wheel bearing apparatus is a so-called second generation type and includes a wheel hub 21 and a wheel bearing 22. The wheel hub 21 has a wheel mounting flange 4. A cylindrical portion 21b axially extends, through a shoulder portion 21a, from the wheel mounting flange 4. The wheel hub 21 is made of medium carbon steel including carbon of 0.40~0.80% by weight such as S53C. A region, including the shoulder portion 21a and the cylindrical portion 21b, is hardened by high frequency induction hardening to have a surface hardness of 50~64 HRC.

The wheel bearing 22 includes an outer member 23 integrally formed with a body mounting flange 23b on its outer circumferential surface. It is formed with tapered double row outer raceway surfaces 23a, 23a on its inner circumferential surface. A pair of inner rings 24, 24, formed with tapered inner raceway surfaces 24a, 24a on their outer circumferential surfaces, are arranged opposite to the double row outer raceway surfaces 23a, 23a. Double row rolling elements (tapered rollers) 26, 26 are freely rollably contained between the inner and outer raceway surfaces 24a, 24a and 23a, 23a via cages 25, 25.

A larger diameter side of the inner raceway surface 24a of each inner ring 24, 24 is formed with a larger flange 24b to guide the rolling elements 26. A smaller diameter side of the inner raceway surface 24a is formed with a small flange 24c to prevent slipping off of the rolling elements 26. The inner rings 24, 24 are set with their front ends (ends at the sides of small flanges 24c) abutting each other. Thus, they form a back-to-back double row tapered roller bearing.

The wheel bearing 22 is press fit onto the cylindrical portion 21b via a predetermined interference. It is axially immovably secured relative to the wheel hub 21 by a caulked portion 2d. The caulked portion 2d is formed by plastically deforming, radially outwardly, the end portion of the cylindrical portion 21b. The inner ring 24 of the outer side is abutted against the shoulder portion 21a. Similarly to the previously described first embodiment, the caulked portion 2d is cut after the cylindrical portion 21b has been plastically deformed to form a slightly recessed annular portion 19a at the radially outermost end of the flat surface 19. This prevents the burrs and/or warps generated on the radially outermost end from projecting from the flat surface 19 of the caulked portion 2d. Thus, this assures surface contact between the shoulder portion of the outer joint member (not shown) and the caulked portion 2d.

The vehicle wheel bearing apparatus can be applied to the wheel bearing apparatus of a self-retaining structure where an inner ring(s) is (are) press fit onto the wheel hub. The wheel hub and the inner ring(s) are united by a caulked portion formed by plastically deforming radially outwardly the end portion of the wheel hub.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A vehicle wheel bearing apparatus comprising:
    an outer member formed with double row outer raceway surfaces on its inner circumferential surface;
    an inner member including a wheel hub and at least one inner ring, the wheel hub has a wheel mounting flange formed at its one end, a cylindrical portion axially extends from the wheel mounting flange, and the inner ring has at least one inner raceway surface arranged opposite to the plurality of outer raceway surfaces, the inner ring is press fit onto the cylindrical portion of the wheel hub;
    double row rolling elements are freely rollably contained between the outer and inner raceway surfaces,
    an outer joint member forms a constant velocity universal joint, the outer joint member has a cup-shaped mouth portion, a shoulder portion forms a bottom of the mouth portion, a shaft portion axially extends from the shoulder portion and is adapted to be axially separably and torque transmittably inserted into the wheel hub with the shoulder portion abutting against a caulked portion for transmitting torque between them;
    the inner ring is axially secured relative to the wheel hub by the caulked portion, the caulked portion is formed by plastically deforming, radially outwardly, the end portion of the cylindrical portion;
    the caulked portion has a flat surface formed by a cutting process adapted to be in surface contact with the shoulder, and
    a radially outermost end of the flat surface includes a slightly recessed annular portion formed by a cutting process, said slightly recessed annular portion is arranged so that it does not abut against the shoulder reducing surface pressure applied to the caulked portion.

2. The vehicle wheel bearing apparatus of claim 1 wherein the radially outermost end of the flat surface is formed with a larger diameter than a diameter of the radially outermost end of the shoulder of the outer joint member.

3. The vehicle bearing apparatus of claim 1 wherein the caulked portion remains as a non-quenched portion with a surface hardness below 25 HRC after forging, a region of a hardened layer of the outer joint member is limited within a region of a corner portion of the shoulder portion, and the shoulder portion abutting against the caulked portion remains as a non-quenched portion having a surface hardness below 25 HRC after forging.

4. A vehicle wheel bearing apparatus comprising:

an outer member formed with double row outer raceway surfaces on its inner circumferential surface;

an inner member including a wheel hub and at least one inner ring, the wheel hub has a wheel mounting flange formed at its one end, a cylindrical portion axially extends from the wheel mounting flange, and the inner ring has at least one inner raceway surface arranged opposite to the plurality of outer raceway surfaces, the inner ring is press fit onto the cylindrical portion of the wheel hub;

double row rolling elements are freely rollably contained between the outer and inner raceway surfaces, an outer joint member forms a constant velocity universal joint, the outer joint member has a cup-shaped mouth portion, a shoulder portion forms a bottom of the mouth portion, a shaft portion axially extends from the shoulder portion and is adapted to be axially separably and torque transmittably inserted into the wheel hub with the shoulder portion abutting against a caulked portion for transmitting torque between them;

the inner ring is axially secured relative to the wheel hub by the caulked portion, the caulked portion is formed by plastically deforming, radially outwardly, the end portion of the cylindrical portion;

the caulked portion has a flat surface formed by a cutting process adapted to be in surface contact with the shoulder, a radially outermost end of the flat surface is arranged so that it does not abut against the shoulder; and the radially outermost end of the flat surface is formed with a larger diameter than a diameter of the radially outermost end of the shoulder of the outer joint member.

5. A vehicle wheel bearing apparatus comprising:

an outer member formed with double row outer raceway surfaces on its inner circumferential surface;

an inner member including a wheel hub and at least one inner ring, the wheel hub has a wheel mounting flange formed at its one end, a cylindrical portion axially extends from the wheel mounting flange, and the inner ring has at least one inner raceway surface arranged opposite to the plurality of outer raceway surfaces, the inner ring is press fit onto the cylindrical portion of the wheel hub;

double row rolling elements are freely rollably contained between the outer and inner raceway surfaces, the inner ring is axially secured relative to the wheel hub by the caulked portion, the caulked portion is formed by plastically deforming, radially outwardly, the end portion of the cylindrical portion;

the caulked portion has a flat surface on the end surface formed by a cutting process;

a radially outermost end of the flat surface includes a slightly recessed annular portion, said slightly recessed annular portion is formed by a cutting process.

\* \* \* \* \*